Nov. 11, 1924.  
J. W. BISHOP  
MOLDING PRESS  
Filed March 5, 1923

Inventor:
Joseph W. Bishop
By: Wm. O. Bell, Atty.

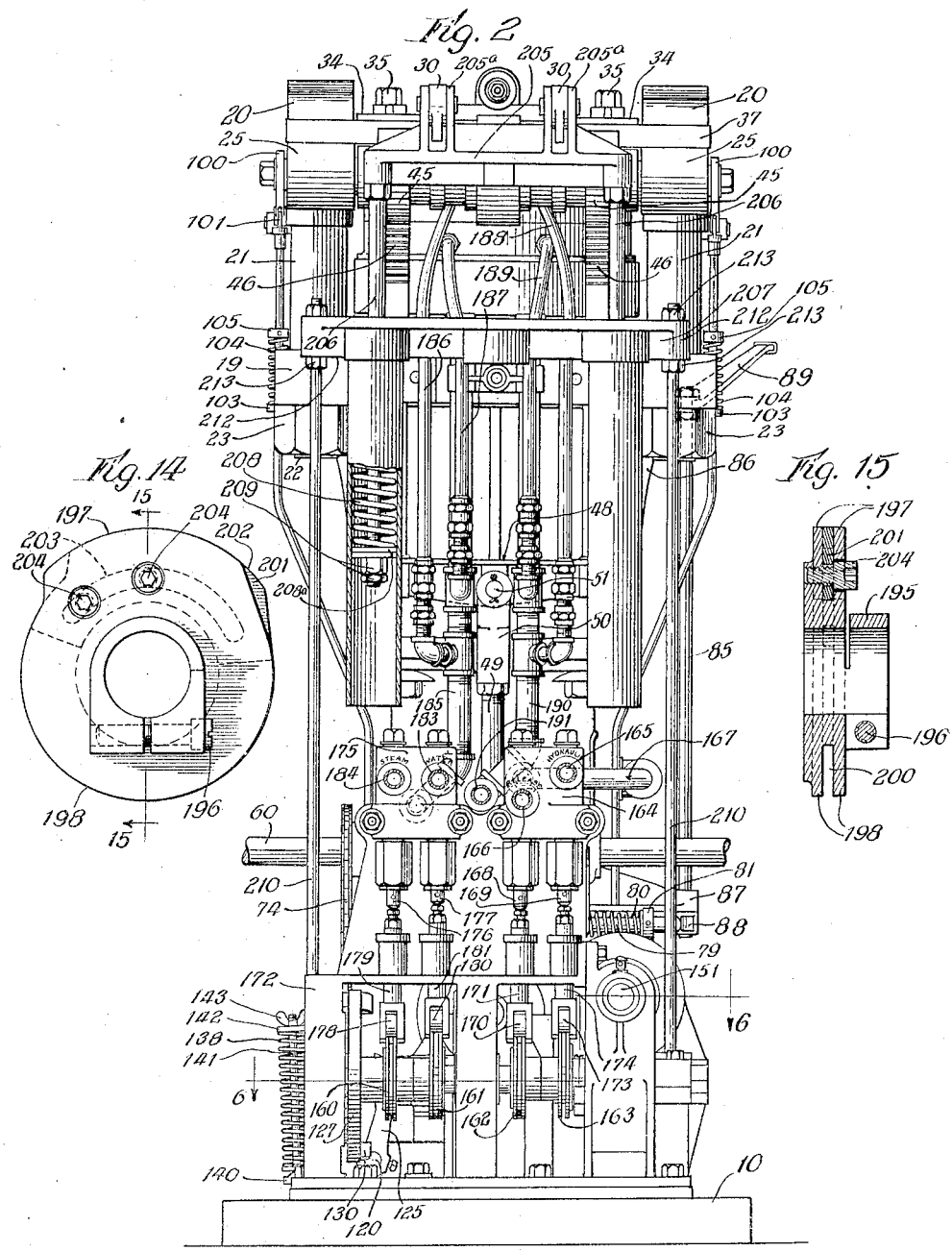

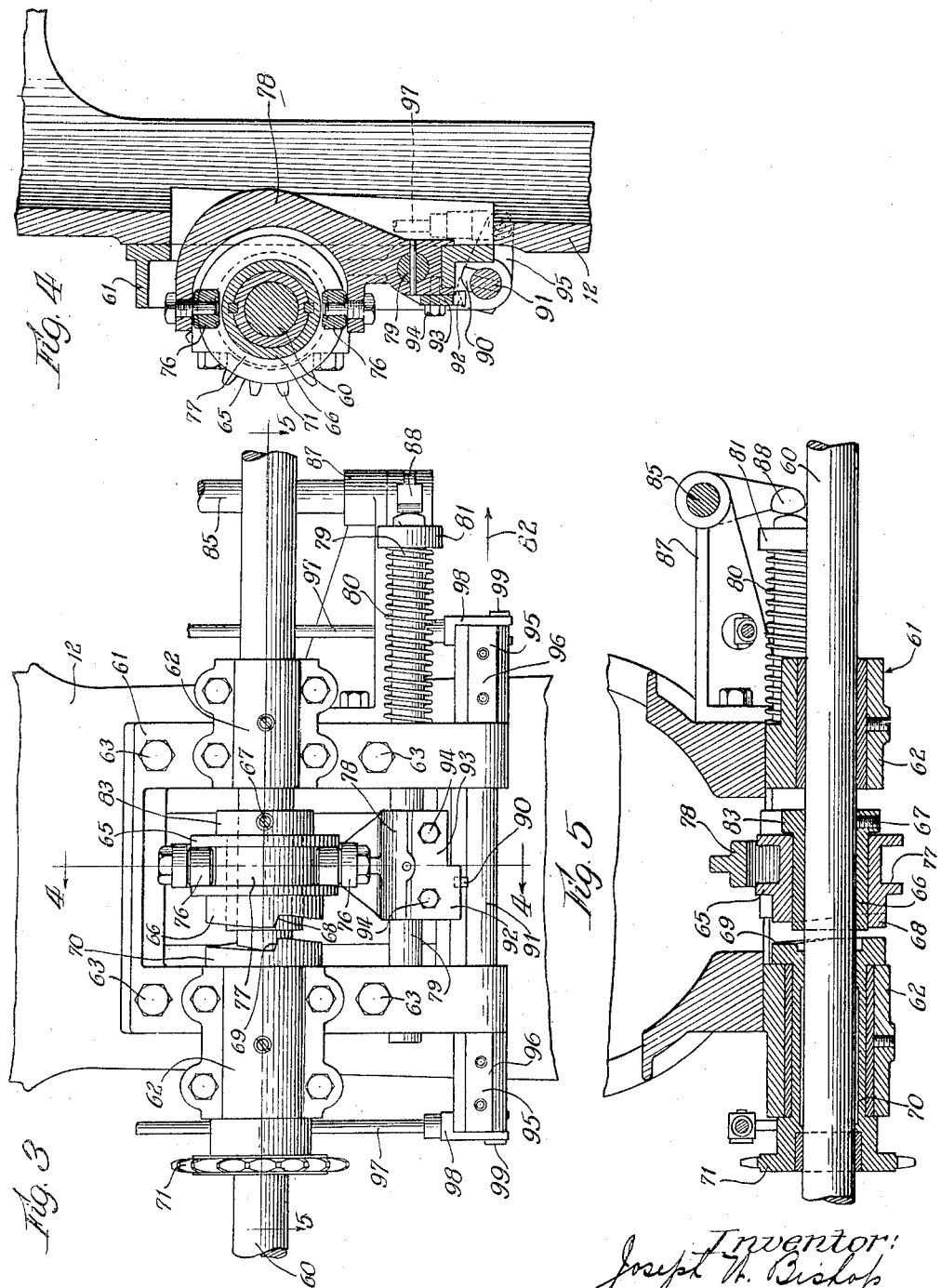

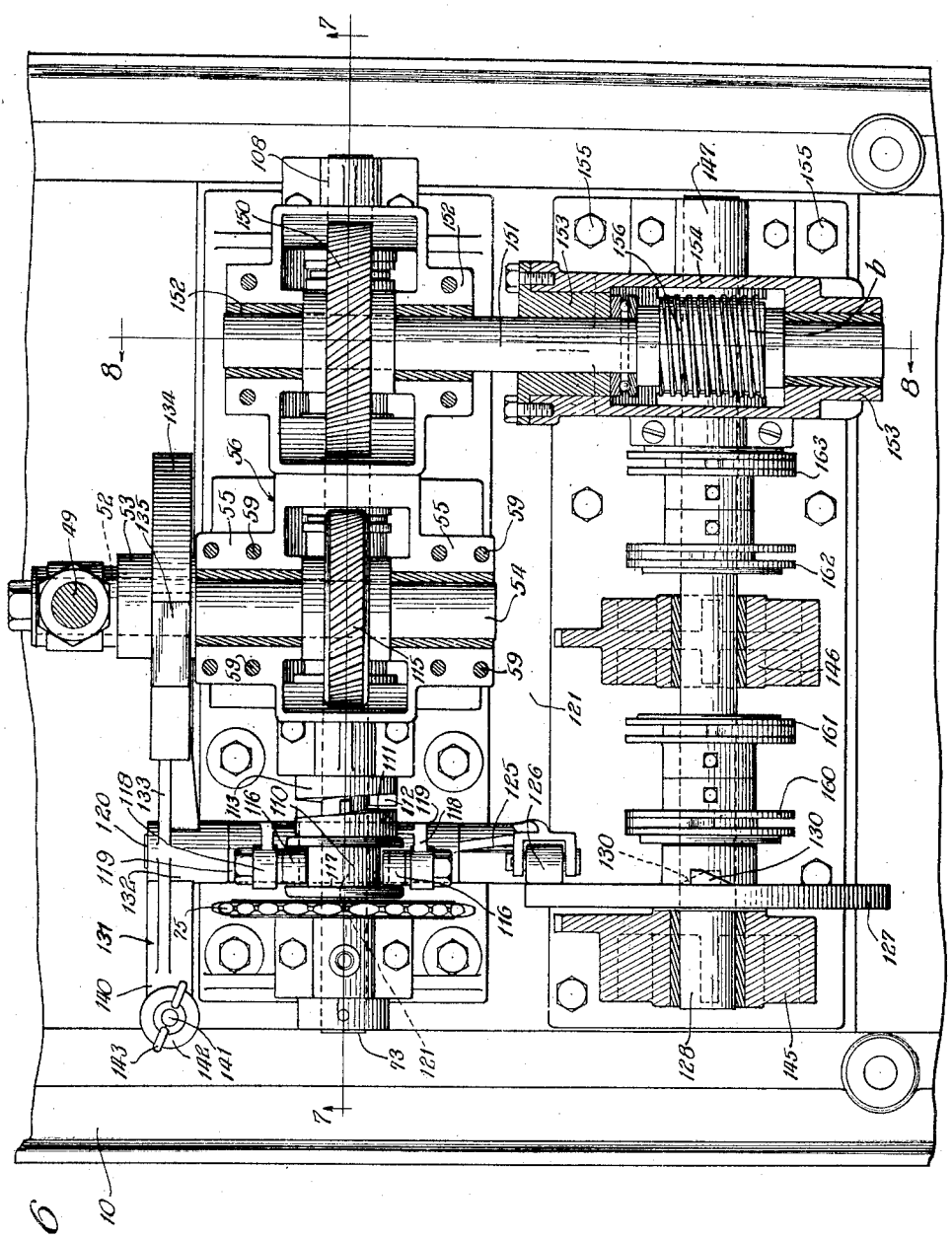

Nov. 11, 1924.                                                1,515,540
                       J. W. BISHOP
                      MOLDING PRESS
                   Filed March 5, 1923        7 Sheets-Sheet 5
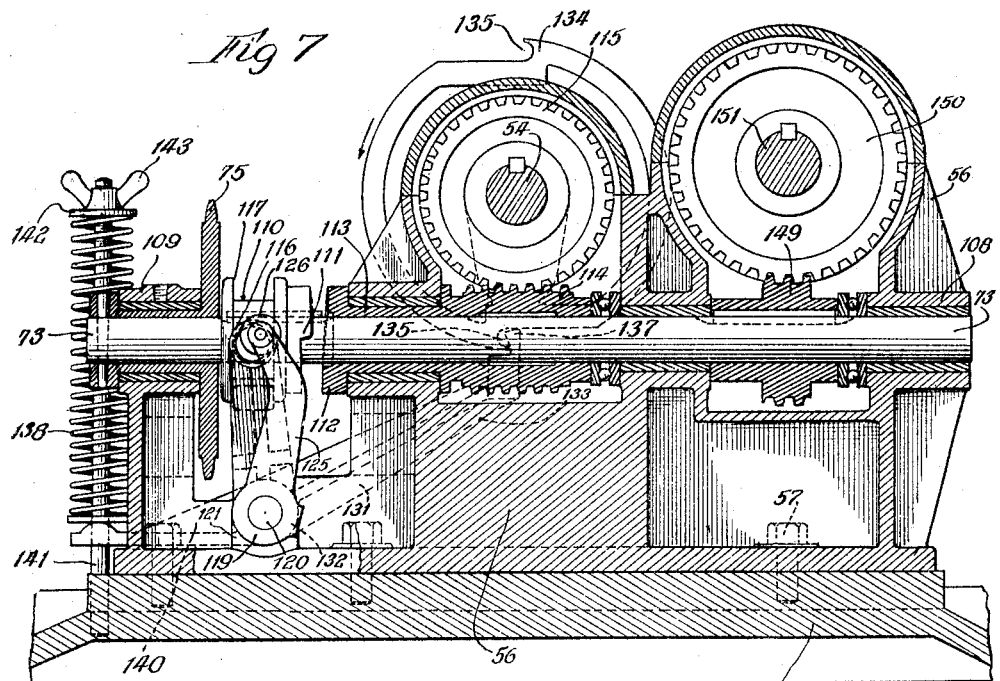
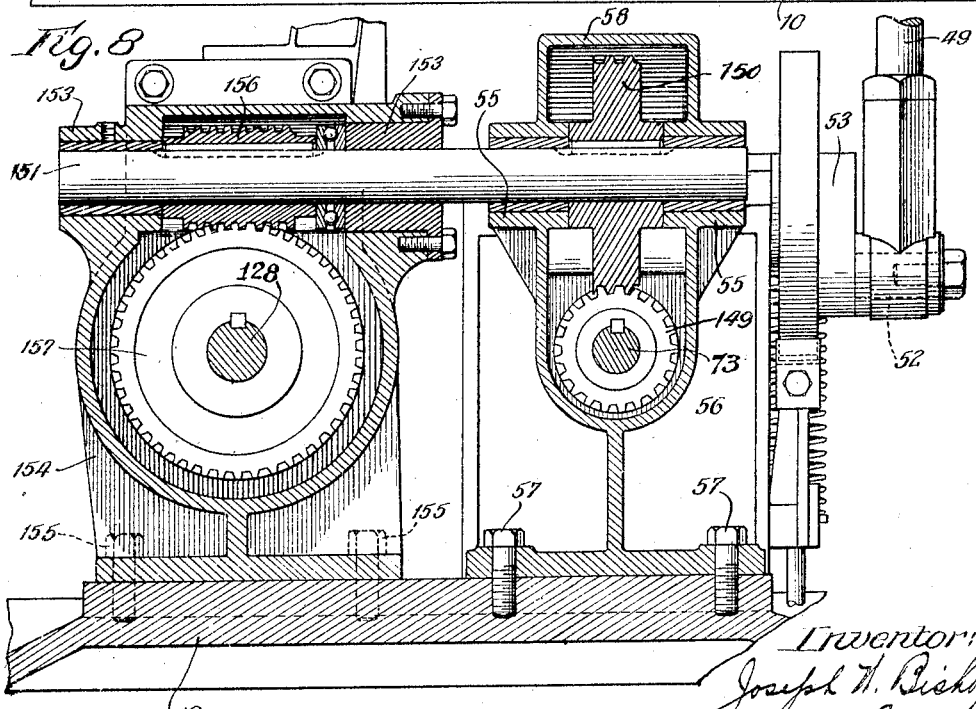
Inventor:
Joseph W. Bishop
By Wm O. Belt
    Atty.

Nov. 11, 1924.
J. W. BISHOP
MOLDING PRESS
Filed March 5, 1923
1,515,540
7 Sheets-Sheet 6
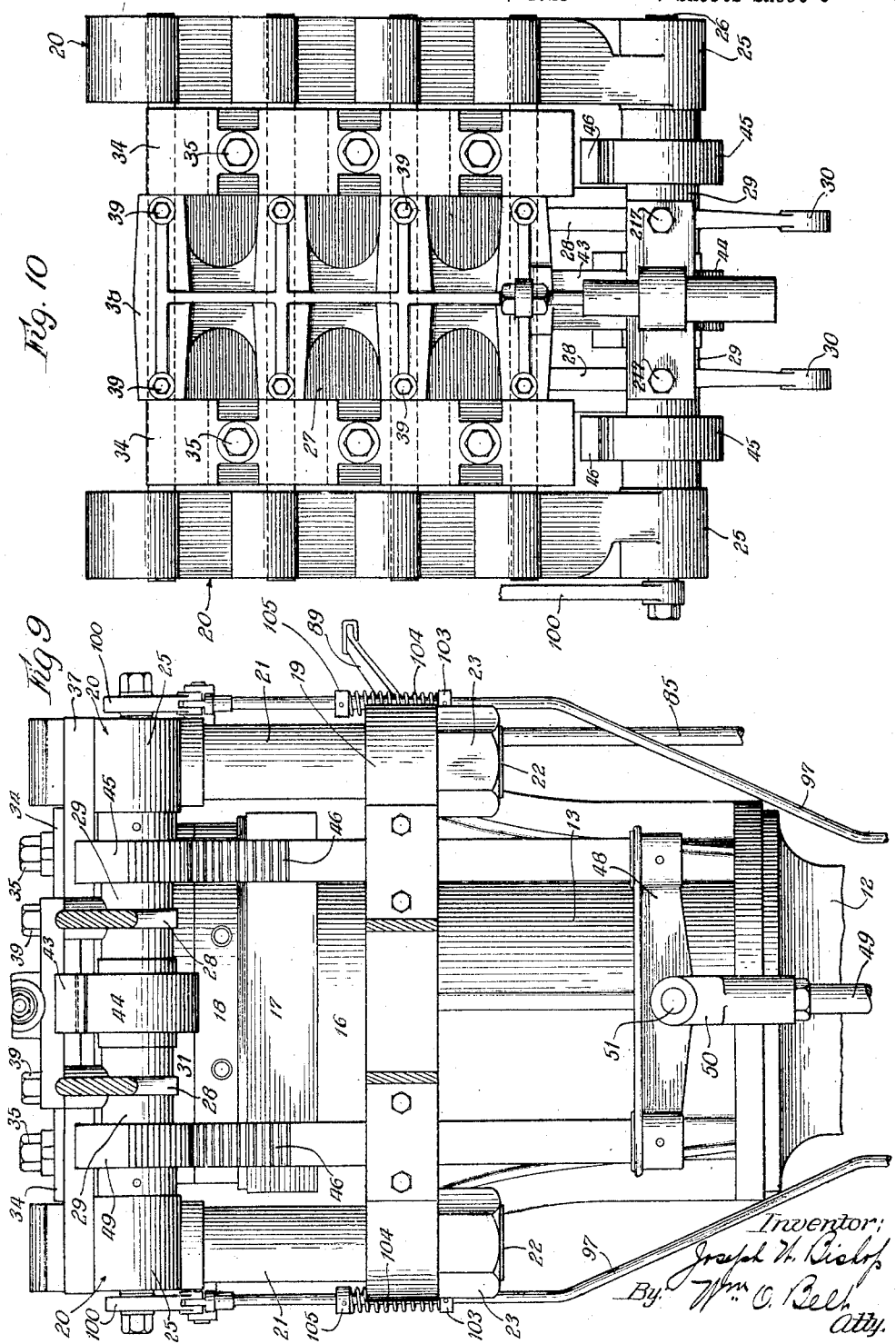

Nov. 11, 1924.    1,515,540
J. W. BISHOP
MOLDING PRESS
Filed March 5, 1923    7 Sheets-Sheet 7
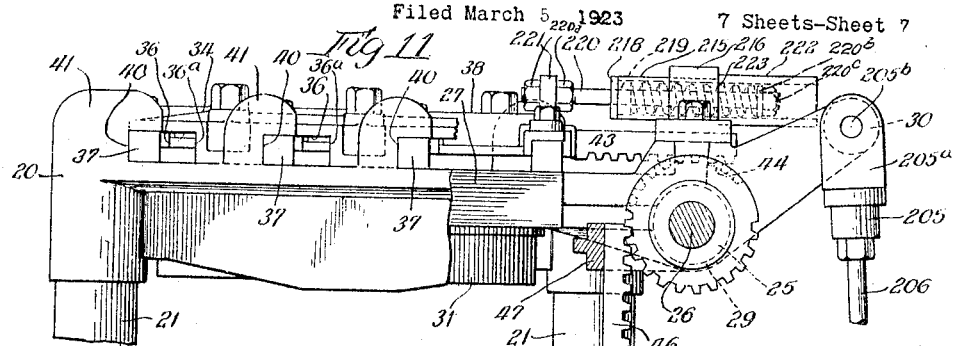
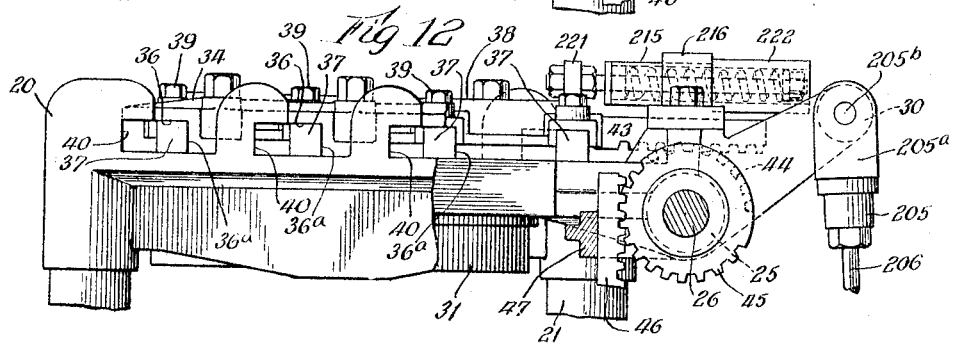
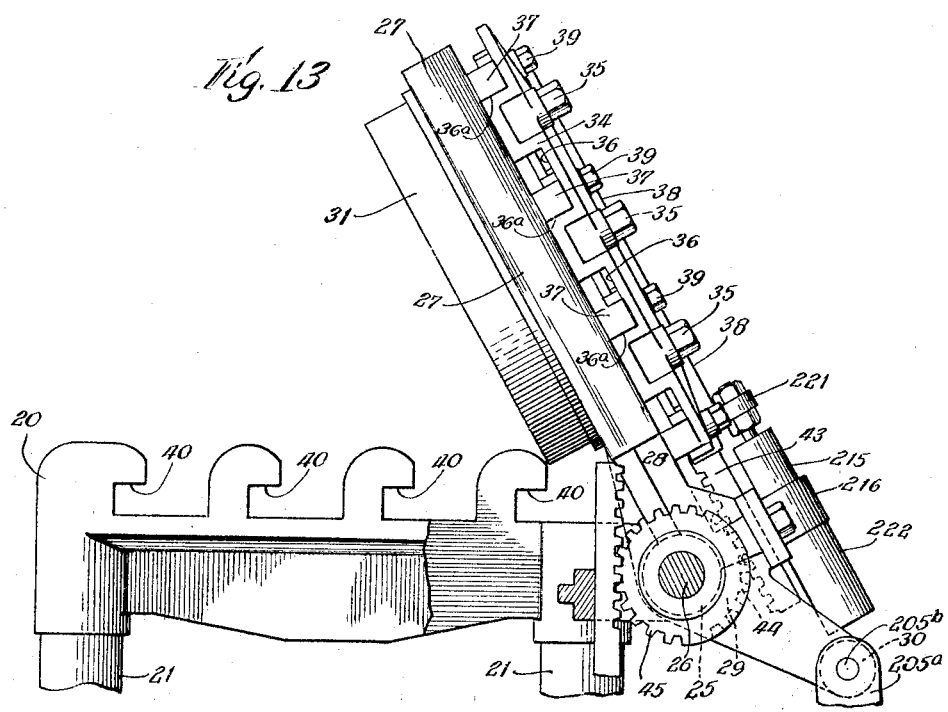
Inventor:
Joseph W. Bishop
By: Wm. O. Bell  Atty Patented Nov. 11, 1924.

1,515,540

UNITED STATES PATENT OFFICE.

JOSEPH W. BISHOP, OF MUSKEGON, MICHIGAN, ASSIGNOR TO BRUNSWICK-BALKE-COLLENDER COMPANY, OF WILMINGTON, DELAWARE, A CORPORATION OF DELAWARE.

MOLDING PRESS.

Application filed March 5, 1923. Serial No. 622,838.

*To all whom it may concern:*

Be it known that I, JOSEPH W. BISHOP, a citizen of the United States, residing at Muskegon, in the county of Muskegon and State of Michigan, have invented certain new and useful Improvements in Molding Presses, of which the following is a specification.

My invention relates to a molding press, and more particularly to a press of the type employed in the manufacture of phonograph records and the like.

The main object of my invention is to provide an improved power driven press of the character described in which the several operations are automatically performed, thus leaving to the operator only the work of feeding moldable compound to the press and of removing the finished product from the press.

Other objects of my invention are to provide an improved power driven press of the character described which may be continuously operated, or may be operated intermittently if the operator so desires; which comprises means for automatically producing a phonograph record or the like in a predetermined period of time; which can be operated at a comparatively high rate of speed; in which any cycle of a sequence of cycles will be identical with the other cycles of the sequence, thus insuring uniformity of the product; and which comprises a bed, a pair of cooperating molds operatively connected to the bed, automatically controlled means for heating and cooling the molds, and automatic means for bringing the molds into pressing engagement.

These and other objects of my invention will be more clearly pointed out as the detail description progresses, reference being had to the accompanying drawings, wherein—

Fig. 2 is a rear elevation of my improved press.

Fig. 3 is a section taken on the line 3—3 of Fig. 1.

Fig. 4 is a section taken on the line 4—4 of Fig. 3.

Fig. 5 is a section taken on the line 5—5 of Fig. 3.

Fig. 6 is a section taken on the line 6—6 of Fig. 2.

Fig. 7 is a section taken on the line 7—7 of Fig. 6.

Fig. 8 is a section taken on the line 8—8 of Fig. 6.

Fig. 9 is a section on the line 9—9 of Fig. 1.

Fig. 10 is a plan elevation of a platen which is pivotally mounted in the press, and of a portion of the bed of the press adjacent the platen.

Fig. 11 is a detail view illustrating the construction and operation of the pivotally mounted platen, and of the means whereby it is locked to the bed of the press during the period of time that it is in pressing engagement with a cooperating platen.

Fig. 12 is a detail view of the same mechanism as shown in Fig. 11, the parts being shown in a changed position.

Fig. 13 is a detail view of the same mechanism as is illustrated in Figs. 11 and 12, the platen being tilted from the position shown in Figs. 11 and 12.

Fig. 14 is a detail view of a novel cam which I employ in my improved press, and Fig. 15 is a section taken on line 15—15 of Fig. 14.

Like characters of reference designate like parts throughout the several views.

Figure 1:
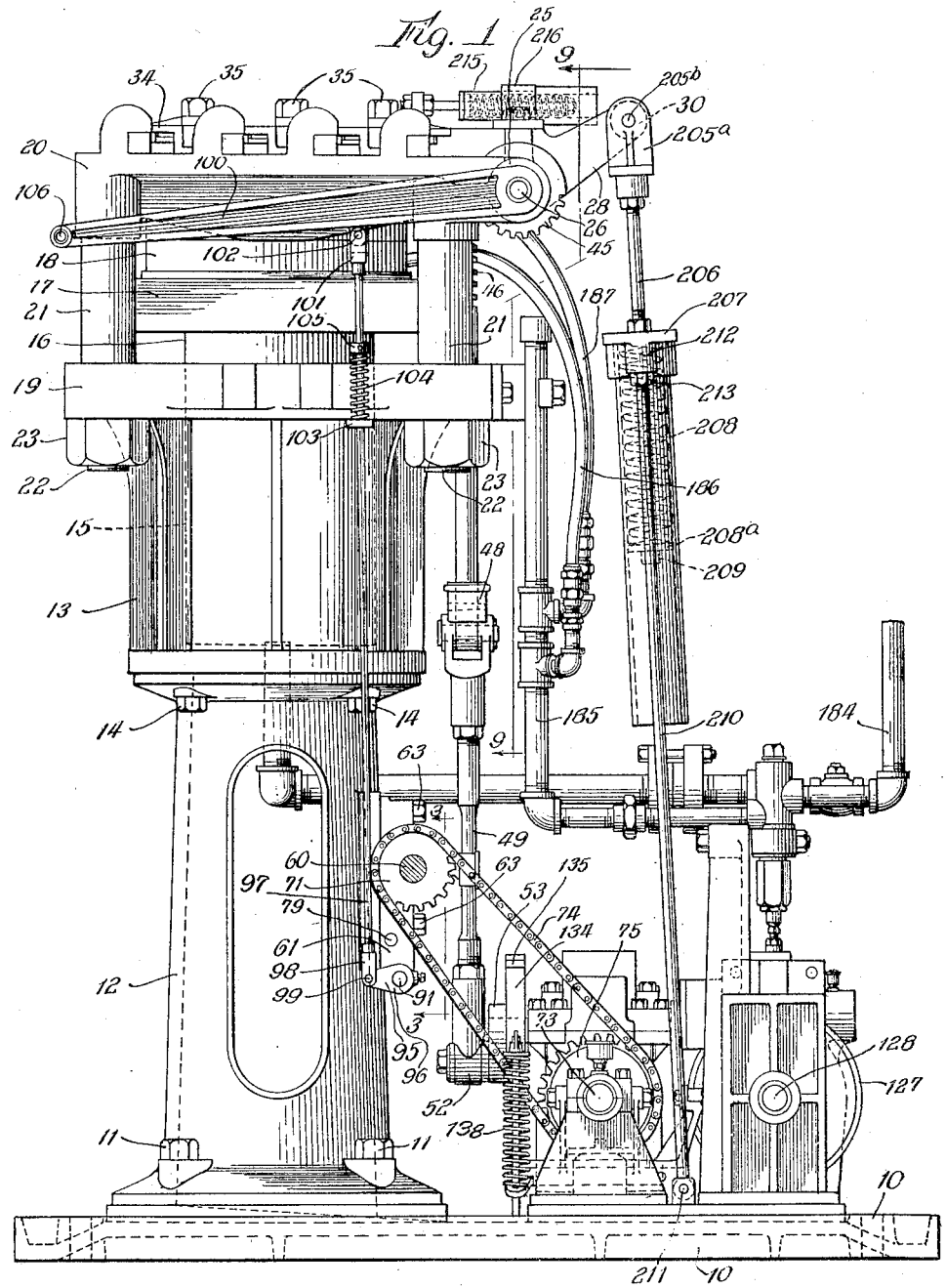
Fig. 1 is a side elevation of my improved press.

Referring for the present to Figures 1 and 2, the reference character 10 designates a bed plate, and secured to it by bolts 11—11 is a base 12 which carries on its upper surface a cylinder casting 13, rigidly secured to the base 12 by bolts 14—14. A cylindrical recess is formed in the casting 13 thus providing a cylinder 15 adapted to receive a plunger 16. The plunger 16 has mounted upon it at its upper end a platen 17 carrying a mold 18.

The plunger 16 is adapted to raise and lower the mold 18, means being provided whereby fluid under pressure may be admitted to the cylinder 15 to force the plunger 16 upwardly and whereby the fluid may afterwards be permitted to flow from the cylinder to allow the plunger to descend. These means will be described hereinafter.

Cast integral with the cylinder casting 13 at its upper edge is a flange 19 upon which is mounted a pair of bearing brackets 20—20. Each bearing bracket 20—20 is provided with a pair of downwardly extending posts 21—21 having reduced threaded portions 22—22 passing through suitable holes in the flange 19. Nuts 23—23 are threaded upon the threaded portions 22—22 and serve to secure the bearing brackets 20—20 to the flange 19. It will be apparent that the bed plate 10, base 12, cylinder casting 13 and brackets 20—20 constitute the bed of the press.

Each of the bearing brackets 20—20 is provided with a rearwardly extending bearing 25, in which a transverse shaft 26 is journaled. Pivotally mounted upon the shaft 26 is a platen 27. (Figs. 10 and 11). To so pivotally mount the platen 27 upon the shaft 26, I provide the platen 27 with a pair of rearwardly extending arms 28—28 having hub portions 29—29 bored to receive the shaft 26. It will be noted that the arms 28—28 continue beyond the hubs 29—29 and terminate in bosses 30—30. (Figs. 1 and 10). The bosses 30—30 serve to connect the platen 27 with certain shock absorbing mechansm, a description of which will presently appear.

Referrring now to Figs. 11, 12 and 13, it will be apparent that the platen 27 may be brought into and out of alignment with the platen 17, the platen 27 being in alignment with the platen 17 when it is in the horizontal position illustrated in Figs. 11 and 12. When the platen 27 is disposed in its horizontal position it of course lies in a plane normal to the direction of travel of the plunger 16 and platen 17. When the platen 27 is tilted upwardly and rearwardly as shown in Fig. 13 access may be readily had to a mold 31 rigidly secured to its lower surface. The molds 18 and 31 carry dies or matrices for the manufacture of phonograph records or the like and may be of the type and structure illustrated and described in U. S. Patent No. 1,399,817, granted to T. Steventon under date of December 13, 1921, but this invention is not directed to the particular type of molds or dies employed, nor to the details of the cylinder and plunger which force the molds into pressing engagement, but means are employed for heating and cooling the molds, and these means are a part of my invention.

I will now describe in detail the structure of the platen 27, means for rigidly locking it to the bearing brackets 20—20 when it is in its horizontal position, and the means for bringing the platen 27 into and out of alignment with the platen 17.

As shown in Fig. 10 the platen 27 when aligned with the platen 17 is disposed between the bearing brackets 20—20. Secured to the upper surface of the platen 27 and disposed along its side edges, the edges adjacent the bearing brackets 20—20, are a plurality of brackets 34—34, bolts 35—35 being provided to rigidly secure the brackets 34—34 to the platen 27. Each bracket 34 has in its lower surface a plurality of grooves 36—36 extending transversely of the press and adapted, together with the upper surface of the platen 27, to become guideways for a plurality of locking bars 37—37. (Figs. 10 and 11.) The locking bars are carried by a slide 38 disposed between the brackets 34—34. Bolts 39—39 fasten each of the bars 37—37 to the slide. It will be noted that the bars 37—37 project beyond the brackets 34—34 and are adapted to enter a plurality of slots 40—40 cut into a plurality of lugs 41—41 extending upwardly from each of the bearing brackets 20—20. The slots 40—40 open rearwardly, but it is apparent that the movement of the bars 37—37 in a forward direction is limited. From the above description it will be readily understood that the platen 27 may be moved into its horizontal position and securely locked to the brackets 20—20 by the bars 37—37, as the slide 38 may be moved forwardly until the bars 37—37 enter the slots 40—40. As the bars 37—37 are designed to fit snugly in the slots 40—40, the platen 27 will be held rigid with respect to the bed of the press.

To operate the slide 38, thereby locking or unlocking the platen 27 to or from the bed of the press, I provide a rack 43 which is rigid with the slide 38. The rack 43 meshes with a segmental gear 44 rigidly secured upon the shaft 26, and oscillation of the shaft will produce a corresponding reciprocation of the rack and slide. The segmental gear 44 is disposed intermediate a pair of segmental gears 45—45 which are also rigidly secured to the shaft 26. Each of the segmental gears 45—45 meshes with a rack 46—46, each rack 46 being slidably mounted in the flange 19 and one of a pair of lugs 47 formed integrally with the bearing brackets 20—20.

As hereinbefore set forth the platen 27 is journaled upon the shaft 26 through the medium of its hubs 29—29 and therefore reciprocation of the racks 46—46 resulting in oscillation of the shaft 26 will not of itself displace the platen 27 from any position it may be occupying. But it is apparent that reciprocation of the racks 46—46 will cause the rack 43 to reciprocate in a like manner through the medium of the segmental gears 45—45, the shaft 26 and the segmental gear 44, and as the rack 43 is rigidly secured to the slide 38, the latter will be alternately moved forwardly and rearwardly causing the locking bars 37—37 to enter or leave the slots 40—40 in the lugs 41—41. When the slide 38 is drawn rearwardly the locking bars 37—37 will be withdrawn from the slots 40—40 until they clear the slots and engage the end faces 36ᵃ of the three grooves 36 nearest the front end of the press, thus preventing further motion of the slide 38. The rack 43 and segmental gear 44 will then lock, and additional travel of the racks 46—46 in an upwardly direction will cause the platen 27 and the brackets 34—34, slide 38 and the bars 37—37 carried by the platen to swing upwardly and rearwardly about the axis of the shaft 26. (Fig. 13.) If the racks 46—46 are drawn downwardly while the platen and the mechanism it carries are in the position shown in Fig. 13, the platen 27 will be returned to a position wherein the lugs 37—37 engage the top surfaces of the bearing brackets 20—20. Continued downward motion of the racks 46—46 will then cause the segmental gears 45—45 to rotate the shaft 26 relatively to the platen 27. This motion will be transmitted through the segmental gear 44 and rack 43 to the slide 38, causing the slide to move forwardly so that the locking bars 37—37 enter the slots 40—40 in the bearing brackets 20—20. The forward motion of the slide 38 is limited of course by the bottom surfaces of the slots 40—40 which serve as stops.

The means for reciprocating the racks 46—46 comprises a mechanism for synchronizing this motion with respect to the various operations of the press, and for this reason I preferably rigidly secure the lower ends of the racks 46—46 to a cross head 48. (Figs. 1 and 9). The cross head 48 is pivotally secured intermediate its ends to the upper end of a pitman 49 by means of a clevis 50 and a pin 51. The lower end of the pitman 49 is journaled on a crank pin 52 of a crank arm 53 fastened to and driven by a shaft 54. The shaft 54 is journaled in split bearings 55—55 of a gear box 56 mounted upon the bed plate 10 and secured thereto by bolts 57—57. (Figs. 6 and 8). A cap having the upper halves of the split bearings 55—55 formed integrally therewith is employed to close the gear box 56 and is held rigidly thereto by bolts 59—59.

The means for actuating the shaft 54 includes a driving shaft 60 having its axis disposed transversely of the press. (Figs. 1, 2 and 3). The driving shaft 60 is journaled in a bearing block 61 having bearings 62—62 for this purpose. The bearing block 61 is rigidly secured to the base 12 by a plurality of bolts 63—63. It is of course understood that the driving shaft 60 may be driven continuously from any suitable source of power and may be in the nature of a line shaft which is adapted to drive a battery of the presses. To operatively connect the driving shaft 60 with the mechanism of the press I provide a clutch collar 65 splined to a sleeve 66 which is disposed around the driving shaft 60 and secured thereto by a set screw 67. The clutch collar 65 and sleeve 66 are both disposed intermediate the bearings 62—62. The clutch collar 65 is provided with jaws 68—68 adapted to engage similar jaws 69—69 formed integrally with a sleeve 70 journaling the driving shaft 60 and in turn journaled in the right hand bearing 62. (Figs. 3 and 5). A sprocket 71 formed integrally with the sleeve 70 at its outer end is adapted to rotate a driven shaft 73 by means of a sprocket chain 74 and a sprocket 75 keyed to the driven shaft 73; but of course the driven shaft 73 is rotated only when the clutch jaws 68—68 of the clutch collar 65 engage the clutch jaws 69—69 of the sleeve 70. To effect such engagement when desired I provide manually controlled means comprising a pair of anti-friction rollers 76—76 resting in a groove 77 turned in the clutch collar 65. The anti-friction rollers 76—76 are mounted upon and carried by a slide 78 which is pinned to a shaft 79. The shaft 79 is slidably mounted in the bearing block 61 below the driving shaft 60 and has its axis disposed parallel to the axis of the driving shaft 60. As shown in Fig. 3 the shaft 79 and slide 78 are normally held in a position wherein the anti-friction rollers 76—76 hold the clutch jaws 68—68 out of engagement with the clutch jaws 69—69. The means for holding the shaft 79 and slide 78 in the above mentioned position comprises a helical compression spring 80 disposed around the shaft 79 and having one end bearing against the bearing block 61 and the other end bearing against a collar 81 turned on the shaft 79. It is apparent that the helical spring 80 will normally force the shaft 79, slide 78 and clutch collar 65 in the direction indicated by the arrow 82, (Fig. 3), holding the mechanism as shown in a position wherein the clutch collar 65 rests against an annular flange 83 formed upon the sleeve 66. If it is desired to bring the clutch jaws 68—68 and 69—69 into effective engagement, it is but necessary to move the shaft 79 in a direction opposite that indicated by the arrow 82. To accomplish this a vertically disposed shaft 85 is provided and is journaled in upper and lower bearing brackets 86 and 87, respectively. (Fig. 2). The upper bearing bracket 86 is formed integrally with the cylinder casting 13, and the lower bearing bracket 87 is rigidly secured to the base 12 in a suitable manner. At the lower end of the vertically disposed shaft 85, a lever 88 rigidly secured thereto is adapted to engage that end of the shaft 79 about which the helical spring 80 is disposed. At the upper end of the vertically disposed shaft 85 is a hand lever 89 by means of which the shaft 85 may be rotated so that the lever 88 will displace the shaft 79 in a direction opposite to that indicated by the arrow 82. This displacement of the shaft will cause the clutch jaws 68—68 to engage the clutch jaws 69—69, the motion of the shaft being transmitted through the slide 78 and antifriction rollers 76 to the clutch collar 65.

As it is desirable to lock the clutch jaws 68—68 in engagement with the clutch jaws 69—69 to permit continuous operation of the press a lug 90 projects from a shaft 91 journaled in the lower end of the bearing block 61. The axes of the several shafts 60, 79 and 91 are disposed parallel with one another. As shown in Figs. 3 and 4 the lug 90 is adapted to enter the path of a lug 92 formed on a plate 93 which is bolted to the slide 78 by bolts 94. It is apparent that if the slide 78 be displaced from the position shown in Fig. 3 to a position wherein the clutch jaws engage each other and the shaft 91 is rotated to carry the lug 90 into the path of the lug 92, the lug 90 will prevent return of the slide to the position shown in Fig. 3. The clutch jaws 68—68 will then be effectually locked in engagement with the clutch jaws 69—69. Means are provided which tend to rotate the shaft 91 in a counter clockwise direction (Fig. 4) so that the lug 90 will move into the path of the lug 92 whenever the vertically disposed shaft 85 is rotated to cause engagement of the two clutch members having the clutch jaws 68—68 and 69—69. The means normally tending to rotate the shaft 91 in a counter clockwise direction (Fig. 4) comprises a pair of levers 95—95, one of which is secured to each of the ends of the shaft 91 by means of hub members 96—96 formed integrally with the levers 95—95. The free end of each of the levers 95—95 is pivotally secured to one of a pair of vertically disposed rods 97—97, a clevis 98, and a pin 99 for each of the rods 97 being employed to so pivotally secure the free ends of the levers 95—95 to the rods 97—97. The upper end of each of the rods 97—97 is pivotally secured to one of a pair of levers 100—100 which are in turn pivotally mounted upon the ends of the shaft 26. The rods 97—97 are pivotally secured to the levers 100—100 by means of clevises 101—101 and pins 102—102. Each of the rods 97—97 passes through one of a pair of plates 103—103 which are secured to the lower surface of the flange 19 forming part of the cylinder casting 13. A helical compression spring 104 having its lower end resting upon one of the plates 103—103 is disposed around each of the rods 97—97. The upper end of each of the helical compression springs 104—104 bears against a set collar 105 secured upon the rod 97 which is associated with that particular spring. By these means the rods 97—97 are normally forced in an upward direction thereby tending to rotate the shaft 91 in a counter clockwise direction (Fig. 4), this force being transmitted through the levers 95—95. When the clutch jaws 68—68 and 69—69 are in engagement and the lug 90 has been brought into the path of the lug 92 to hold the jaws in engagement with each other, the rods 97—97 may be forced downwardly against the tension of the springs 104—104 to withdraw the lug 91 from the path of the lug 92 so that the clutch jaws 68—68 may be disengaged from the clutch jaws 69—69. For the purpose of so forcing the rods 97—97 in a downward direction the free ends of the levers 100—100 are connected by a rod 106 extending transversely of the machine, the rod 106 having each of its ends rigidly secured in one of the free ends of the levers 100—100. The rod 106 is located in front of the press at a point slightly below the upper surface of the bearing brackets 20—20. It is therefore accessible to the operator who may at any time push it downward, thereby causing the rods 97—97 to move downwardly and, through the mechanism described above, disengage the clutch jaws 68—68 from the clutch jaws 69—69. The press will then come to a complete stop.

Figs. 1, 6, 7 and 8 illustrate the means whereby the driven shaft 73 reciprocates the racks 46—46, the racks in turn being adapted to bring the platen 27 into and out of alignment with the platen 17 and to lock the platen 27 in the aligned position. As has been described the driving shaft 60 may rotate the driven shaft 73 by means of the sprocket chain 74 which meshes with the sprockets 71 and 75, the sprocket 75 being keyed to the driven shaft 73. One end of the shaft 73 is journaled in a split bearing 108 formed in the gear box 56 and its other end extends through the hub of sprocket 75, which is journaled in a split bearing 109 formed in the gear box 56. A clutch collar 110 is splined to the shaft 73 and is disposed between the bearings 108 and 109. As shown in Fig. 7 the clutch collar 110 is adjacent the sprocket and is provided with clutch jaws 111—111 adapted to operatively engage the clutch jaws 112—112 of a sleeve 113 journaled upon the shaft 73. A worm 114 formed integrally with the sleeves 113 meshes with a worm gear 115 rigidly secured to the shaft 54, to the forward end of which is secured the aforementioned crank arm 53. From the above description it will be readily understood that the shaft 73 will reciprocate the racks 46—46 when the clutch jaws 111—111 engage the clutch jaws 112—112, the motion of the shaft being transmitted through the clutch collar 110, sleeve 113, worm 114, worm gear 115, shaft 54, crank arm 53, crank pin 52, pitman 49 and cross head 48. To force the clutch jaws 111—111 into engagement with clutch jaws 112—112 a pair of anti-friction rollers 116—116 ride in a groove 117 turned in the clutch collar 110. Each anti-friction roller 116 is carried upon the free end of a lever 118 having a hub 119 rigidly secured to a shaft 120. The shaft 120 is disposed beneath the shaft 73 and has its axis normal to the axis of shaft 73. (Fig. 7.) A bearing 121 formed in the gear box 56 journals the shaft 120, a hub 119 of one of the levers 118 being disposed on either side of the bearing 121. Secured to the rearwardly extending end of the shaft 120 is a lever 125 carrying at its free end an anti-friction roller 126 adapted to contact a cam plate 127 which is rigidly secured to a shaft 128. (Fig. 6). The axis of the shaft 128 is disposed parallel to the axis of the shaft 73 and means are provided whereby the shaft 73 may drive the shaft 128, as will presently be described. The cam plate 127 has upon its inner face a pair of lugs 130—130 which are diametrically disposed with respect to each other and the axis of the shaft 128. The lugs 130—130 are arranged to displace the anti-friction roller 126 from its normal position resting against the inner face of the cam plate 127. (Fig. 6). As each of the lugs 130 passes beneath the anti-friction roller 126 when the shaft 128 is being rotated the lever 125 will rotate the shaft 120 in a clockwise direction (Fig. 7). Such rotation of the shaft will cause the levers 118 and anti-friction rollers 116 to move the clutch collar 110 toward the sleeve 113, thereby bringing the clutch jaws 111—111 into engagement with the clutch jaws 112—112.

Rigidly secured to the forward end of the shaft 120 is a lock lever 131 having a hub 132 intermediate its ends through which the shaft 120 passes. An arm 133 of the lever is adapted to cooperate with a locking cam disk 134 rigidly secured upon the shaft 54. The locking cam disk 134 has two notches 135—135 cut in its periphery and undercut so as to permit a lug 137 in which the arm 133 terminates to enter either of them. To yieldingly force the lug 137 into the notches 135—135 and to keep it in contact with locking cam disk 134 a helical compression spring 138 bears against an arm 140 of the lever 131. The helical compression spring 138 is disposed around a vertically disposed rod 141 threaded into the bed plate 10. The lower end of the spring 138 bears against the arm 140, and the upper end of the spring bears against a washer 142 held in place upon the rod 141 by a wing nut 143. The helical compression spring 138 tends to rotate the shaft 120 in a counter clockwise direction (Fig. 7), thus yieldingly forcing the lug 137 of the arm 133 into contact with the locking cam disk 134.

When the clutch collar 110 and its associated mechanism are in the positions shown in Figs. 6 and 7, the clutch jaws 111—111 are not in engagement with the clutch jaws 112—112, and therefore the sleeve 113 and its integral worm 114 are not being rotated. It will be noted that when the clutch collar is in this inoperative position the lug 137 engages the undercut edge of one of the notches 135—135 and prevents further rotation of the shaft 54 in a counter clockwise direction (Fig. 7), shaft 54 being driven in this direction when the clutch jaws 111—111 engage the clutch jaws 112—112. If one of the cam lugs 130—130 carried by the cam plate 127 should displace the anti-friction roller 126, thereby causing the lever 125 to rotate the shaft 120 in a clockwise direction, (Fig. 7) the arms 118—118 and anti-friction rollers 116—116 will force the clutch collar 110 toward the sleeve 113 until the clutch jaws 111—111 engage the clutch jaws 112—112. At the same time this rotation of the shaft 120 will cause the arm 133 of the lever 131 to move away from the locking cam disk 134 and permit the worm 114 carried by the sleeve 113 to rotate the shaft 54 by means of the worm gear 115. Immediately after the lug 130 has passed beneath the anti-friction roller 126 the helical spring 138 will tend to rotate the shaft 120 in a counter clockwise direction (Fig. 7) thus forcing the lug 137 to ride upon the periphery of the locking cam disk 134. The locking cam disk 134 will of course hold the clutch collar 110 in the position wherein its clutch jaws 111—111 engage the clutch jaws 112—112 until the lug 137 is forced into the following notch 135 by the helical spring 138. The shaft 54 will then be locked against rotation until the following cam lug 130 of the cam plate 127 engages the anti-friction roller 126.

It will be readily understood that as the notches 135—135 are diametrically disposed in the periphery of the locking cam disk 134 the shaft 54 will be rotated through 180° during each engagement of the clutch jaws 111—111 with the clutch jaws 112—112. Therefore, the crank arm 53 will bring the crank pin 52 from its lowermost position to its uppermost position during 180° of a complete revolution and bring it from its uppermost position to its lowermost position during the remaining 180° of the complete revolution. The intermittent motion of the crank pin 52 will intermittently reciprocate the racks 46—46 through the pitman 49 and cross head 48.

The shaft 128 to which the cam plate 127 is rigidly secured is journaled in bearings 145, 146 and 147, mounted upon the bed plate 10. The means for driving the shaft 128 comprises a spiral gear 149 keyed upon the shaft 73 and meshing with a spiral gear 150 keyed upon a shaft 151. The shaft 151 is disposed above and has its axis normal to the axes of the shafts 73 and 128. The shaft 151 is journaled in split bearings 152—152 of the gear box 56 and in bearings 153—153 of a gear box 154 mounted upon the bed plate 10 and secured thereto by bolts 155—155. A worm 156 keyed to the shaft 151 meshes with a worm gear 157 keyed upon the shaft 128. The spiral gears 149 and 150, shaft 151, worm 156 and worm gear 157 will rotate the shaft 128 in synchronism with any rotation of the shaft 73.

Adjustably secured upon the shaft 128 are a plurality of cams 160, 161, 162 and 163. The cams 160 and 161 form part of the mechanism controlling the means for alternately supplying heating and cooling fluids to the molds 18 and 31. The cams 162 and 163 form part of the means for admitting fluid under pressure to the cylinder 15 and for afterwards permitting the fluid to flow from the cylinder 15.

I will first describe the mechanism associated with the cams 162 and 163.

Referring to Fig. 2, the reference character 164 designates a double hydraulic valve to which fluid under pressure is led by a pipe 165 and from which fluid may pass through the exhaust pipe 166. The fluid entering the valve 164 through the pipe 165 may pass to the cylinder 15 through a pipe 167 and may flow from the cylinder 15 back through the pipe 167 to the valve 164 to be exhausted through the pipe 166. This invention is not concerned with the construction of the particular hydraulic valve employed, and as it is of a type well known to those skilled in the art it is not thought necessary to illustrate and describe its interior construction. However, valve stems 168 and 169 project from its valve casing. The valve carried by the valve stem 168 is controlled by the cam 162, an anti-friction roller 170 being provided at the lower end of a post 171 slidably mounted in a bracket 172, mounted upon and secured to the bed plate 10. The lower end of the valve stem 168 is held in contact with the upper end of the post 171 by spring means (not shown) disposed within the valve 164. The valve stem 169 is associated with the cam 163 in a like manner, an anti-friction roller 173 riding upon the cam 163 and carried by a post 174, which is slidably mounted in the bracket 172 being adapted to actuate the valve stem 169. The valves are so controlled by the cams that the fluid under pressure is admitted to the cylinder 15 while the platen 27 is aligned with the platen 17 and locked to the bearing brackets 20 by the locking bars 37—37. During the part of the cycle that the platen 27 is not in alignment with the platen 32 the valve 164 will permit the fluid to flow from the cylinder 15 and discharge through the pipe 166.

The means for alternately supplying heating and cooling fluids to the molds 18 and 31 comprise a double valve 175 from the casing of which projects a valve stem 176 and a valve stem 177. The valve stem 176 carries a valve which controls the admission of steam to the molds, and the valve stem 177 carries a valve which controls the admission of cold water to the molds. The valve stem 176 is actuated by the cam 160 through an anti-friction roller 178 which rides upon the cam 160 and is carried in the lower end of a post 179 slidably journaled in the bracket 172. In a similar manner the valve stem 177 is actuated by cam 161 through an anti-friction roller 180 which rides upon the cam 161 and is carried in the lower end of a post 181 slidably journaled in the bracket 172. A pipe 183 connects the valve 175 with any suitable source supplying cold water to the valve and a pipe 184 connects the valve 175 with any suitable source supplying steam to the valve. A vertically disposed pipe 185 has its lower end connected to the valve 175 and by means of suitable fittings has its upper end connected to a flexible hose 186 and a flexible hose 187. The flexible hose 186 is connected with the mold 18 and the flexible hose 187 connects with the mold 31, the molds 18 and 31 being chambered to receive the steam and water. The above described mechanism comprising the cams 160 and 161, anti-friction rollers 178 and 180, posts 179 and 181, valve stems 176 and 177, valve 175, pipe 185, flexible hose 186 and 187, together with the sources for supplying steam and cold water to the valve, constitute means for alternately supplying steam and cold water to the molds 18 and 31, the cams 160 and 161 being arranged to correctly time the admission of the fluids to the molds. The fluids are exhausted from the molds 18 and 31 through flexible hose 188 and 189 which are connected to the molds 18 and 31 respectively. The lower ends of the flexible hose 188 and 189 are connected by suitable fittings to a vertically disposed pipe 190 which in turn is connected by suitable fittings to a horizontally disposed exhaust pipe 191. It is readily understood that as the steam and water are alternately supplied to the molds under pressure, each will drive the other before it out through the exhaust system, thus permitting the molds to be alternately heated and cooled.

To aid in correctly timing the admission of fluid under pressure to the cylinder 15 and its subsequent flow from the cylinder 15 and to aid in correctly timing the alternate supply of cooling and heating fluid to the molds 18 and 31 I preferably construct the cams 160, 161, 162 and 163 as illustrated in Figs. 14 and 15. Each cam is made with a split hub 195 which may be tightened upon the shaft 128 by means of a cap screw 196. Each cam is provided with a plurality of permanent dwells as at 197 and 198. An annular groove 200 is turned in the face of the cam and disposed therein is an auxiliary dwell plate 201 having a surface 202 which may be employed to lengthen the dwell 197. A slot 203 in the dwell plate 201 and a pair of bolts 204—204 provide well known means whereby the dwell plate 201 may be rigidly secured to the cam. By adjusting the dwell plate 201 relatively to the dwells 197 and 198 any desired timing for the cam may be had within the limits of the cam.

In addition to the mechanism hereinbefore described for bringing the platen 27 into and out of alignment with the platen 17 and for locking it to the bearing brackets 20—20 I provide means for absorbing the shock of the blow with which the locking bars 37—37 first strike the bearing brackets 20—20 when the platen 27 is brought to its aligned position. This mechanism comprises a bracket 205 having two pairs of upwardly extending lugs 205$^a$, between each pair of which is pivotally secured one of the bosses 30—30 by means of pins 205$^b$. As hereinbefore set forth the bosses 30—30 are carried by the rearwardly extending arms 28 of the platen 27. Rigidly secured in the bracket 205 and extending downwardly therefrom are a pair of rods 206—206. Each of the rods 206—206 is slidably journaled in a bracket 207 and has disposed around its lower end a helical compression spring 208 having its upper end resting against the bracket 207 and its lower end resting against a washer 208$^a$ positioned upon the lower end of the rod by locking and adjusting nuts 209—209. A pair of radius rods 210—210 having their lower ends pivotally secured by means of pins 211—211 to the bed plate 10 have their upper ends rigidly secured in bosses 212 formed upon the bracket 207 by nuts 213. It is apparent that the bracket 207 is carried by the rods 210 and that it is pivotally secured to the bed plate 10.

When the platen 27 is in the position shown in Fig. 13 the helical compression springs 208—208 have extended themselves. Then as the platen 27 is moved into alignment with the platen 17 the springs 208—208 are compressed, this compression attaining a maximum when the locking bars 37—37 engage the top surfaces of the bearing brackets 20—20. The function of the springs 208—208 is to absorb the vibrations resulting from the shock of the blow with which the bars 37—37 strike the bearing brackets 20—20.

As the locking bars 37 are forcibly brought into contact with the bottom surfaces of the slots 40 at the completion of the locking operation, means have been provided to absorb the shock of this blow comprising a cylinder 215 mounted in a bracket 216. The bracket 216 is rigidly secured to the hubs 29 of the platen 27 by bolts 217—217. The forward end of the cylinder 215 is closed by a plug 218 threaded into it, the plug 218 having a central bore 219 through which a rod 220 passes. The forward end of the rod 220 is rigidly secured by nuts 220$^a$ in and to a lug 221 cast integral with the slide 38. A helical compression spring 222 is disposed around the rod 220 and has one of its ends bearing against the plug 218 and the other of its ends bearing against a washer 220$^b$ positioned upon the rearwardly extending end of the rod by a nut 220$^c$. It will be noted that the cylinder 215 has its forwardly extending end turned to a smaller diameter so as to provide a shoulder 223, thereby obviating the necessity of rigidly securing it to the bracket 216. When the locking means and platen 27 occupy the positions relative to each other shown in Figs. 12 and 13 the helical compression spring 222 is in an extended condition. As the locking bars 37—37 are forced forwardly to occupy the positions shown in Fig. 11 the helical spring 222 is compressed and will absorb the vibrations caused by the bars 37—37 when they strike the bottom surfaces of the slots 40—40.

In the operation of the device, the operator starts the press by means of the hand lever 89 causing the lever 88 to force the shaft 79 in a direction opposite to that indicated by the arrow 82. The anti-friction rollers 76—76 carried by the slide 78 which is secured to the shaft 79 will then force the clutch jaws 68—68 into operative engagement with the clutch jaws 69—69, thereby driving the sprocket 71. As has been described, the lug 90 projecting from the shaft 91 will move into the path of the lug 92 of the plate 93 secured to the slide 78 and prevent disengagement of the clutch jaws 68—68 from the clutch jaws 69—69 until the operator presses downward upon the rod 106 which, through the rods 97—97 and against the tension of the springs 104—104, will rotate the shaft 91 sufficiently to remove the lug 90 from the path of the lug 92. The press is preferably operated continuously, but the operator may stop it at any time, and at the completion of each cycle if he so desires.

At the completion of a cycle the platen 27 occupies the position relative to the press which is shown in Fig. 13. The operator may then remove the finished product and any excess material which has been squeezed out from between the dies or matrices. If so desired, the operator may next place in the mold labels or the like which are to identify the product. A quantity of moldable material is then removed from a hot plate or other means for keeping the material in the condition desired and is placed upon the lower mold. The platen 27 will then be brought into alignment with the platen 17, the locking bars 37—37 coming into engagement with the upper surfaces of the bearing brackets 20—20 as shown in Fig. 12. The mechanism which brings the platen 27 from the position shown in Fig. 13 to a position wherein it is aligned with the platen 17 comprises the segmental gears 45—45 and the racks 46—46, the racks 46—46 being moved upwardly to effect alignment of the platen 27 with the platen 17. Continued motion of the racks 46—46 in an upward direction causes the locking bars 37—37 to enter the slots 40—40 in a manner and by means of the mechanism hereinbefore described. Shortly before the platen 27 moves into alignment with the platen 17 steam is supplied to the molds 18 and 31. The steam heats the molds and keeps the material supplied to the press in a moldable condition until the dies or matrices have been brought into a pressing engagement. The steam is supplied to the molds from any suitable source through the flexible hose 186 and 187, the valve 175 and cam 160 serving to control the admission of steam to the molds.

Immediately after the platen 27 has been locked to the bearing brackets 20—20 fluid under pressure is supplied to the cylinder 15 and the plunger 16 is forced upwardly, bringing the mold 18 and platen 17 into pressing engagement with the mold 31 and platen 27. The admission of the fluid under pressure, to the cylinder 15 is of course controlled by the valve 164 and its associated cams 162 and 163.

Shortly after the fluid under pressure has been admitted to the cylinder 15, the valve 175 and cams 160 and 161 operate to shut off the flow of steam to the molds and direct a stream of cold water to them through the flexible hose 186 and 187, the steam in the molds being driven out before the water through the flexible hoses 188 and 189. The supply of cold water to the molds is continued until shortly before the valve 164 and its associated mechanism shut off the supply of fluid under pressure to the cylinder.

Toward the end of the cycle the racks 46—46 are moved downwardly in a manner hereinbefore described, admission of fluid under pressure to the cylinder 15 having ceased, and the valve 164 having been actuated to permit the fluid in the cylinder to flow out through the valve 164 and the exhaust pipe 166. The fluid under pressure in flowing to or from the cylinder 15 passes through the valve 164 and the pipe 167 connecting the valve 164 with the cylinder 15. As the motion of the racks 46—46 in a downward direction continues the platen 27 will first be unlocked from the bearing brackets 20—20 and then will swing into the position shown in Fig. 13, and the operator may remove the completed product.

I have learned after considerable experimenting that a cycle extending through a period of 40 seconds is ample to permit the press to form and harden a phonograph record or the like produced by the press, and also to give the operator sufficient time to remove the product from the machine and to supply to it moldable material during the time the platen 27 is out of alignment with the platen 17. In practice I set the mechanism of the press so that the platens are in alignment for approximately 26 seconds of the 40 seconds required in a cycle, the remainder of the cycle or approximately 14 seconds being used to remove the finished product from the press and to supply molding material to the molds. The mechanism of the press is also designed and set to supply steam to the molds for approximately 6 seconds before the platen 27 has moved into alignment with the platen 17, the supply of steam being then cut off and cold water supplied to the molds for approximately 14 seconds.

I am aware that changes in the form construction and arrangement of parts may be made without departing from the spirit and without sacrificing the advantages of the invention, and I reserve the right to make all such changes as fairly fall within the scope of the following claims.

I claim:

1. A press comprising a bed, a platen mounted in the bed, a second platen operatively connected to the bed, a driving shaft, a driven shaft, means operatively connecting the driving and driven shafts, means including a clutch associated with the driven shaft for bringing the second platen into and out of alignment with the first platen, and means for automatically controlling the operation of the clutch.

2. A press comprising a bed, a platen disposed in the bed, a second platen operatively connected to the bed, a driven shaft, a second shaft, means including a clutch for operatively connecting the driven and second shafts, means actuated by the driven shaft for controlling the clutch, and means actuated by the second shaft for bringing the second platen into and out of alignment with the first platen.

3. A press comprising a bed, a platen disposed in the bed, a second platen operatively connected to the bed, a driven shaft, a second shaft, means operatively connecting the driven and second shafts, means actuated by the driven shaft for controlling the last mentioned means, and means actuated by the second shaft for bringing the second platen into and out of alignment with the first platen.

4. A press comprising a bed, a platen disposed in the bed, a second platen operatively connected to the bed, a driven shaft, a second shaft, means operatively connecting the driven and second shafts, means actuated by the driven shaft for controlling the last mentioned means, and means actuated by the driven shaft including a rack and a segmental gear for alternately moving the second platen into and out of alignment with the first platen.

5. A press comprising a bed, a platen disposed in the bed, a shaft journaled in the bed, a second platen journaled upon the shaft, locking means operatively connecting the second platen to the shaft, a segmental gear rigidly secured to the shaft, a rack meshing with the segmental gear, and means for reciprocating the rack to bring the second platen into and out of alignment with the first platen and to lock and unlock the second platen to and from the bed.

6. A press comprising a bed, a driving shaft, a platen disposed in the bed, a second shaft journaled in the bed, a second platen journaled upon the second shaft, locking means operatively connecting the second platen to the second shaft, a segmental gear rigidly secured to the second shaft, a rack meshing with the segmental gear, and means actuated by the driving shaft for reciprocating the rack to bring the second platen into and out of alignment with the first platen and to lock and unlock the platen to and from the bed.

7. A press comprising a bed, a platen disposed in the bed, a second platen pivotally mounted on the bed, a driven shaft, a second shaft, a clutch having one of its members splined on the driven shaft and the other of its members journaled on the driven shaft, means operatively connecting the journaled member to the second shaft, means actuated by the driven shaft for alternately bringing the clutch members into and out of operative engagement with each other, and means actuated by the second shaft for alternately bringing the second platen into and out of alignment with the first platen.

8. A press comprising a bed, a platen mounted in the bed, a second platen operatively connected to the bed, a driving shaft, a driven shaft, a third shaft, means operatively connecting the driving and driven shafts, means including a clutch for operatively connecting the driven and third shafts, means including a cam mounted on the third shaft for alternatively holding the clutch in operative and inoperative positions, and means operated by the third shaft for moving the second platen into and out of alignment with the first platen.

9. A press comprising a bed, a platen mounted in the bed, a second platen operatively connected to the bed, a driving shaft, a driven shaft, a third shaft, means operatively connecting the driving and driven shafts, means including a clutch for operatively connecting the driven and third shafts, means including a cam mounted on the third shaft for alternately holding the clutch in operative and inoperative positions, means for releasing the clutch from its ineffective position when so held, and means operated by the third shaft for moving the second platen into and out of alignment with the first platen.

10. A press comprising a bed, a platen mounted in the bed, a second platen pivotally secured to the bed, a driving shaft, a driven shaft, a third shaft, means including a clutch for operatively connecting the driven and third shafts, means including a cam mounted on the third shaft for alternately holding the clutch in effective and ineffective positions, means for releasing the clutch from its ineffective position when so held, and means operated by the third shaft for moving the second platen into and out of alignment with the first platen.

11. A press comprising a bed, a mold in the bed, a second mold operatively connected to the bed, a driven shaft, a second shaft, means for operatively connecting the shafts, means including a cam actuated by the driven shaft, and a second cam actuated by the second shaft for controlling the first mentioned means, and means associated with the second shaft for moving the second mold into and out of alignment with the first mold.

12. A press comprising a bed, a mold in the bed, a second mold operatively connected to the bed, a driven shaft, a second shaft, means for operatively connecting the driven shaft to the second shaft whereby the driven shaft may rotate the second shaft, means actuated by the driven shaft for making inoperative the last mentioned connecting means, means for holding said connecting means in an operative position through a predetermined period of time, and means actuated by the second shaft for moving the second mold into and out of alignment with the first mold.

13. A press comprising a bed, a mold in the bed, a second mold operatively connected to the bed, a driven shaft, a second shaft, connecting means interposed between the shafts whereby the driven shaft may rotate the second shaft, means actuated by the driven shaft for bringing said connecting means into an operative position, means for holding said connecting means in an operative position during a predetermined period of time, means actuated by the driven shaft for returning said connecting means into an inoperative position, and means actuated by the second shaft for moving the second mold into and out of alignment with the first mold.

14. A press comprising a bed, a mold in the bed, a second mold operatively connected to the bed, a driven shaft, a second shaft, a clutch having one of its members splined to the driven shaft and the other of its members journaled on the driven shaft, means operatively connecting the journaled member of the clutch with the second shaft, means including a spring for withdrawing the splined member of the clutch from effective engagement with the journaled member thereof, a cam rigidly secured to the second shaft for holding the clutch members in operative engagement with each other during a predetermined period of time, means co-acting with the cam and spring for locking the second shaft against further rotation when the clutch members are disengaged, means actuated by the driven shaft for releasing the second shaft, and means actuated by the second shaft for moving the second mold into and out of alignment with the first mold.

15. A press comprising a bed, a platen in the bed, a second platen operatively connected to the bed, a driving shaft, a driven shaft rotated by the driving shaft, a third shaft, a clutch having one of its members splined to the driven shaft and the other of its members journaled on the driven shaft, a worm associated with the journaled member of the clutch, a worm gear meshing with the worm and rigidly secured to the third shaft, means including a spring and a lever for withdrawing the splined member of the clutch from effecting engagement with the free member of the clutch, a cam rigidly secured to the third shaft for holding the clutch members in operative engagement with each other during a predetermined period of time and for permitting the spring means to disengage the clutch members at the end of this period, the cam and lever co-acting to lock the third shaft against further rotation when the clutch members are disengaged, means actuated by the driven shaft for releasing the third shaft and for forcing the clutch members into operative engagement, and means associated with the third shaft for alternately moving the second platen into and out of alignment with the first platen.

16. A press comprising a bed, a platen, a second platen operatively connected to the bed, means for moving the second platen into and out of alignment with the first platen, means carried by the second platen for automatically locking it to the bed when in the aligned position, means for bringing the first platen into pressing engagement with the second platen, and means for synchronizing the operations of said several means.

17. A press comprising a bed, a driving shaft, a platen in the bed, a second platen operatively connected to the bed, means actuated by the driving shaft for bringing the second platen into and out of alignment with the first platen, and means actuated by the driving shaft for automatically locking the second platen rigid with respect to the bed.

18. A press comprising a bed, a driving shaft, a platen, a second platen operatively connected to the bed, means actuated by the driving shaft for moving the second platen into and out of alignment with the first platen, means actuated by the driving shaft for locking the platen rigid with respect to the bed, means for bringing the first platen into pressing engagement with the second platen, and means actuated by the driving shaft for controlling said last mentioned means.

19. A press comprising a bed, a driving shaft, a platen in the bed, a second platen operatively connected to the bed, means actuated by the driving shaft for moving the second platen into and out of alignment with the first platen, and separate means actuated by said last mentioned means to lock the platen immovable with respect to the bed.

20. A press comprising a bed, a platen in the bed, a second platen pivotally secured to the bed, means for rigidly locking the second platen to the bed, means including a rack and pinion for operatively connecting the second platen with the locking means, and common means for moving the second platen into and out of alignment with the first platen and for operating the locking means.

21. A press comprising a bed, a platen in the bed, a second platen operatively connected to the bed, means carried by the second platen for locking it rigid to the bed, means including a rack and pinion for actuating the locking means, and common means for moving the second platen into and out of alignment with the first platen and for actuating the last mentioned means.

22. A press comprising a bed, a platen in the bed, a shaft journaled in the bed, a second platen journaled on the shaft, means including a rack carried by the second platen for locking it to the bed, a segmental gear rigidly secured to the shaft, and means cooperating with the locking means, segmental gear and shaft for moving the second platen into and out of alignment with the first platen.

23. A press comprising a bed, a platen in the bed, a shaft journaled in the bed, a second platen journaled on the shaft, means carried by the second platen for automatically locking it to the bed, a rack rigidly secured to the locking means, a segmental gear rigidly secured to the shaft and meshing with the rack, a second segmental gear rigidly secured to the shaft, a second rack meshing with the second segmental gear, and means for reciprocating the second rack, the locking means cooperating with the gears and racks to move the second platen into and out of alignment with the first platen when the second rack is reciprocated.

24. A press comprising a bed having a slot formed therein, a platen in the bed, a second platen pivotally secured to the bed, a bar slidably mounted in the second platen, and common means for moving the second platen into and out of alignment with the first platen and for moving the bar into and out of the slot to lock the platen rigid with respect to the bed.

25. A press comprising a bed, a cylinder in the bed, a plunger in the cylinder, a mold carried by the plunger, a second mold pivotally secured to the bed, means for bringing the second mold into and out of alignment with the first mold, means for locking the second mold to the bed when in the aligned position, means for admitting fluid under pressure to the cylinder and for permitting it to flow from the cylinder, means for alternately supplying heating and cooling fluids to the molds, and means for automatically actuating and controlling the several aforementioned means.

26. A press comprising a bed, a driving shaft, a pair of cooperating molds movable relatively to the bed, means for locking one of the molds rigidly to the bed, means for forcing the other of the molds into pressing engagement with the locked mold, means for alternately supplying heating and cooling fluids to the molds, and means associated with the driving shaft for automatically operating and controlling the several aforementioned means.

27. A press comprising a bed, a cylinder in the bed, a plunger in the cylinder, a mold carried by the plunger, a second mold pivotally secured to the bed, means including a valve for admitting fluid under pressure to the cylinder, means including a valve for supplying heating and cooling fluids to the molds, a driven shaft, a second shaft, a third shaft, means including a clutch associated with the driven shaft for intermittently rotating the second shaft, means actuated by the second shaft for moving the second mold into and out of alignment with the first mold, means operatively connecting the driven and third shafts, cam means associated with the third shaft for controlling said valves, and means associated with the driven and third shafts for controlling the clutch.

28. A press comprising a bed, a pair of cooperating molds operatively secured to the bed, means for alternately supplying heating and cooling liquids to the molds, and means including a cam having adjustable dwells for controlling the first mentioned means.

29. A press comprising a bed, a cylinder in the bed, a plunger in the cylinder, a mold carried by the plunger, a second mold operatively connected to the bed, a valve for admitting fluid under pressure to the cylinder and for permitting the flow of fluid from the cylinder, and cam means with adjustable dwells for controlling the valve.

30. A press comprising a bed, a pair of cooperating platens of which one is pivotally secured to the bed, means for swinging the pivoted platen into and out of alignment with the other platen, and shock absorbing means coming into action when the pivoted platen is brought into the aligned position.

31. A press comprising a bed, a platen mounted in the bed, a second platen pivotally secured to the bed, means for swinging the second platen into and out of alignment with the first platen, the second platen resting upon the bed when in the aligned position, and means for cushioning the blow with which the second platen strikes the bed.

32. A press including a bed, a platen pivotally secured to the bed, means for swinging the platen to a position wherein it rests upon the bed, and means for lessening the shock when the platen strikes the bed.

33. A press comprising a bed, a platen associated with the bed, means for moving platen into and out of operative position relative to the bed, means for cushioning the blow with which the platen strikes the bed when moved into its operative position, and means for locking the platen to the bed.

34. A press comprising a bed, a platen mounted in the bed, a second platen pivotally secured to the bed, means carried by the second platen for locking it to the bed in an aligned position relative to the first platen, and means for cushioning the blow with which the locking means strike the bed at the termination of the locking operation.

35. A press comprising a bed, a driving shaft, a platen mounted in the bed, a second platen pivotally secured to the bed, means for moving the second platen into and out of alignment with the first platen, means associated with the driving shaft for locking the second platen to the bed when the second platen is in the aligned position, and means for cushioning the blow with which the locking means strike the bed at the termination of the locking operation.

36. A press comprising a bed, a driving shaft, a platen mounted in the bed, a second platen pivotally secured to the bed, means associated with the driving shaft for moving the second platen into and out of alignment with the first platen, locking means for rigidly securing the second platen to the bed when in its aligned position, and spring means operatively disposed between the second platen and the locking means for lessening the shock of the blow with which the locking means finally engage the bed at the termination of the locking operation.

37. A press comprising a bed, a platen associated with the bed, means for locking and unlocking the platen to the bed, and means for cushioning the blow occurring when the first mentioned means lock the platen to the bed.

38. A press comprising a bed, a driving shaft, a pair of cooperating molds, means for forcing one of the molds into pressing engagement with the other mold, means for alternately supplying heating and cooling fluids to the molds, and means actuated by the driving shaft for automatically operating and controlling the several aforementioned means.

39. A press comprising a bed, a driving shaft, a mold, a second mold, means for bringing the second mold into and out of alignment with the first mold, means for forcing the first mold into pressing engagement with the second mold, means for alternately supplying heating and cooling fluids to the molds, and means associated with the driving shaft for automatically operating and controlling the several aforementioned means.

JOSEPH W. BISHOP.